United States Patent [19]
Richardson et al.

[11] Patent Number: 5,828,333
[45] Date of Patent: Oct. 27, 1998

[54] MULTIPLE ACCESS DIPLEX DOPPLER RADAR

[75] Inventors: David Livingstone Richardson, Arlington Heights; Beverly Jean Timm, Elgin; Mark Douglas Hischke, Algonquin; Kenneth Alan Gustafson, St. Charles; Roger Brunner Williams, Lake Zurich; Stuart J. Collar, Algonquin, all of Ill.

[73] Assignee: Northrop Grumman Corporation, Los Angeles, Calif.

[21] Appl. No.: 774,931

[22] Filed: Jan. 21, 1997

[51] Int. Cl.$^6$ ................................................. G01S 13/93
[52] U.S. Cl. ............................................. 342/70; 375/200
[58] Field of Search ................................. 342/70, 71, 72, 342/194, 196; 375/200

[56] References Cited

U.S. PATENT DOCUMENTS

| | | | |
|---|---|---|---|
| 3,659,293 | 4/1972 | Gupta | 342/129 |
| 3,750,172 | 7/1973 | Tresselt | 342/129 |
| 3,757,339 | 9/1973 | Shear et al. | 342/455 |
| 3,898,655 | 8/1975 | Tresselt | 342/83 |
| 3,916,409 | 10/1975 | Shear et al. | 342/455 |
| 4,148,028 | 4/1979 | Fujiki | 342/70 |
| 4,818,999 | 4/1989 | Kobayashi et al. | 342/59 |
| 5,107,268 | 4/1992 | Sturm et al. | 342/36 |
| 5,181,038 | 1/1993 | Asbury et al. | 342/70 |
| 5,189,426 | 2/1993 | Asbury et al. | 342/70 |
| 5,265,121 | 11/1993 | Stewart | 375/99 |
| 5,285,207 | 2/1994 | Asbury et al. | 342/129 |
| 5,307,349 | 4/1994 | Shloss et al. | 370/85.2 |
| 5,319,641 | 6/1994 | Fridrich et al. | 370/85.3 |
| 5,361,070 | 11/1994 | McEwan | 342/21 |
| 5,467,091 | 11/1995 | Watkins et al. | 342/159 |
| 5,576,627 | 11/1996 | McEwan | 324/639 |
| 5,583,512 | 12/1996 | McEligot | 342/189 |
| 5,646,623 | 7/1997 | Walters et al. | 342/129 |

*Primary Examiner*—John B. Sotomayor
*Attorney, Agent, or Firm*—Terry J. Anderson; Karl J. Hoch, Jr.

[57] ABSTRACT

A continuous wave diplex Doppler radar, comprising an oscillator generating a transmit signal having a spectrum at a carrier frequency, the oscillator having a frequency control input, and spread spectrum modulation means coupled to the frequency control input for spreading the spectrum of the transmit signal.

24 Claims, 4 Drawing Sheets

MULTIPLE ACCESS DIPLEX DOPPLER RADAR

BACKGROUND OF THE INVENTION

1. Technical Field

The present invention relates to a multiple access, continuous wave ("CW"), diplex doppler radar.

2. Background Art

CW diplex Doppler radar is a well known type of CW radar that measures range by transmitting two CW signals and measuring the phase difference between the transmitted and received signals. The distance to the object is calculated from the phase difference.

A CW Doppler radar system is not able to distinguish, however, a return signal reflected by an object sent by a user's transmitter from other radar signals, such as transmitted signals from other users' transmitters or return signals from those transmitters. These received signals from such other sources are interference with respect to the receipt of the first user's return signal. This feature of a CW Doppler radar is a significant disadvantage when operating one radar in the ranges of other such radars.

One application in which there is a compelling need to distinguish return signals is the use of CW Doppler diplex radar for collision avoidance systems. For example, the use of such radars in surface vehicles could enhance safety by providing early warning of impacts with stationary or moving objects. Application of this type of radar could provide information on the range and velocity of objects to enable a driver to take appropriate evasive maneuvers.

It is known, for example by U.S. Pat. Nos. 5,285,207, 5,189,426 and 5,181,038 all of Asbury et al., to apply CW Doppler diplex radar for collision avoidance systems. However, all these inventions track the return signals by means of time-multiplexing the diplex frequencies, which requires a specifically designed switching rate to measure a Doppler shift. Because time resolution is more critical using this approach, this technique adversely effects the ability to measure Doppler. For the same reasons, this approach is also sensitive to error sources such as a noisy or microphonic local oscillator, or operation in a high vibration environment, such as a motor vehicle. In addition, these inventions use analog signal processing techniques, which are less accurate and more susceptible to temperature drift and component variation than digital techniques.

The use of time-multiplexing also prevents the use of spread spectrum techniques to reduce received signal interference. Time-multiplexing methods would require synchronizing the noise signals applied to the diplex waveforms, and there is no known method to achieve this.

SUMMARY OF THE INVENTION

A continuous wave diplex Doppler radar, comprising an oscillator generating a transmit signal having a spectrum at a carrier frequency, the oscillator having a frequency control input, and spread spectrum modulation means coupled to the frequency control input for spreading the spectrum of the transmit signal.

DETAILED DESCRIPTION OF THE PREFERRED EMBODIMENT

Figure 1:
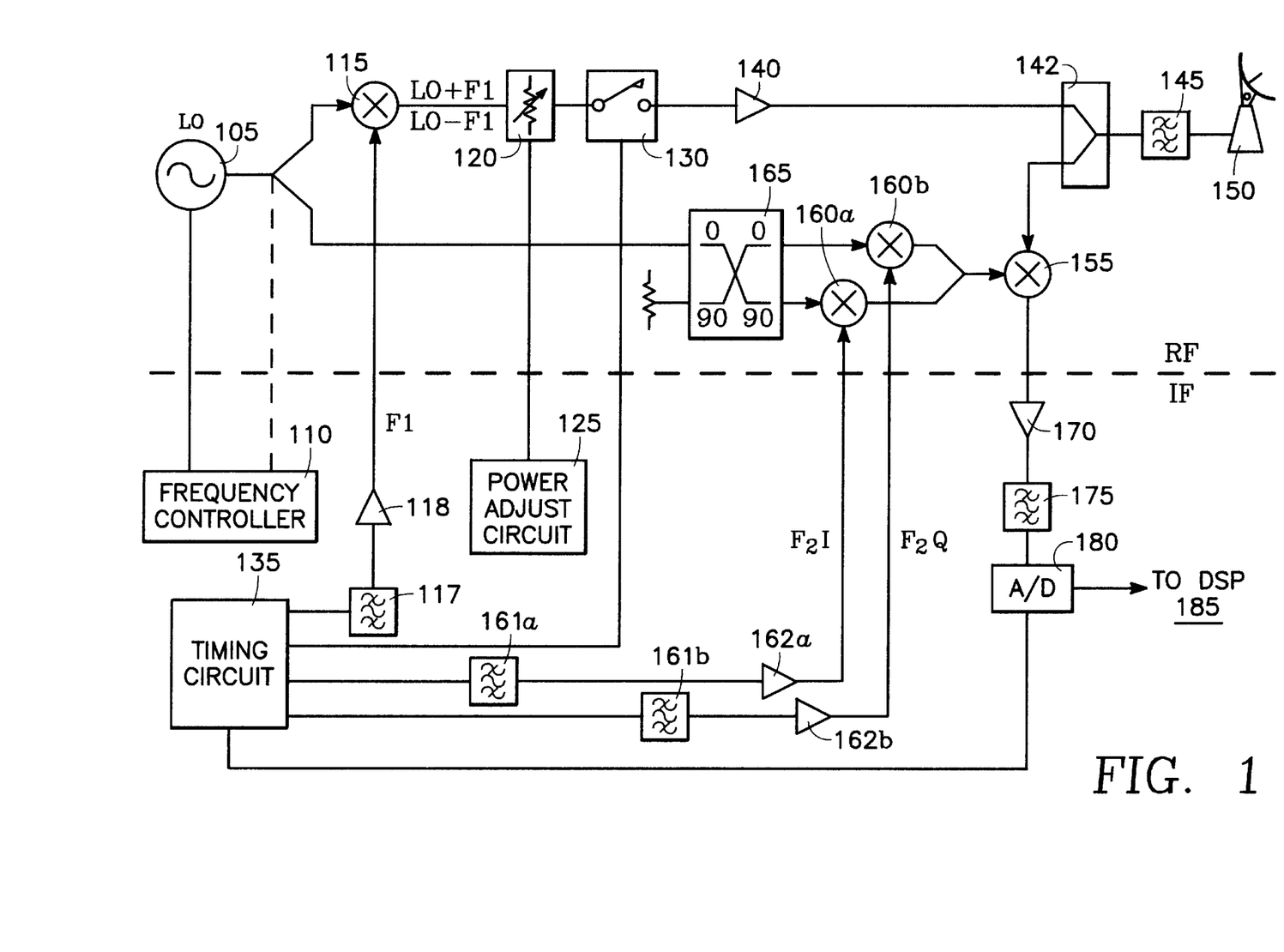
FIG. 1 is a block diagram of a first embodiment of a transmit circuit and a receive circuit of a multiple access, continuous wave ("CW"), diplex doppler radar according to the invention.

A first embodiment of a radar system 100 of the invention is shown in FIG. 1. A local oscillator 105 generates a transmit carrier frequency LO that is set and maintained by a frequency controller 110, which will be described subsequently. The oscillator 105 may, for example, be a voltage-controlled oscillator.

The carrier frequency LO is modulated by an offset frequency signal F1 in a double sideband suppressed carrier mixer 115. The signal F1 is sent by a timing circuit 135 and filtered by filter 117 to remove harmonics and amplified by amplifier 118. The output frequencies of the mixer 115 are LO+F1 and LO−F1. The separation between these diplex signals, or diplex separation, is 2F1, or Δf. Typical values of LO and F1 are 24.125 GHz and 150 KHz, respectively, resulting in a Δf of 300 KHz. Using a well known relationship for diplex radar ranges, these frequencies result in an unambiguous range of approximately 500 meters, which is a reasonable range for vehicular radars.

The output signals from mixer 115 are modulated by an RF attenuator 120 that is controlled by a power adjust circuit 125. The RF signals are then pulse modulated by a transmit switch 130. The switch 130 on-time defines a pulse width W, and a pulse repetition interval (or frame time) is I, where I is greater than W. The switch 130 is controlled by the timing circuit 135.

The RF signals are amplified by an RF power amplifier 140 and coupled by a power splitter 142 to a band pass filter 145. The filter 145 is connected to an antenna 150, which is used for transmit and receive signals. The filter 145 reduces the out-of-band signals in both the transmit and receive mode.

The antenna 150 receives the return signals, which are identical to the transmitted signals except for the time delay, lower amplitude, and the Doppler frequency shift D. The return signals are filtered by the band pass filter 145 and processed by the downconverter mixer 155. A local oscillator for the mixer 155 is offset from the transmit carrier LO by a frequency F2, which offset is performed in lower sideband mixers 160A and 160B, using in phase (F2I) and quadrature components (F2Q) of F2. Signals F2I and F2Q are sent by the timing circuit 135 and filtered by filters 161A and 161B and amplified by amplifiers 162A and 162B, respectively. The transmit carrier inputs to the mixers 160 are in phase and quadrature components of LO produced by a 90 degree phase shifter 165.

The IF output signals of the mixer 155 are F1+F2+D and F1−F2−D. For example, using an F1 of 150 KHz stated previously and an F2 of 50 KHz, the receive IF frequencies are 100 and 200 KHz. These down-converted IF signals are amplified by a low noise IF amplifier 170, band pass filtered by filter 175 and converted to digital signals by an analog-to-digital ("A/D") converter 180. The A/D converter samples the IF signals at a rate suitable for capturing the signal information, as described later. The dynamic range of the A/D converter 180 must be large enough to find a weak signal in the presence of other signals, such as the transmit feedthru signal and ground clutter. For example, this condition would require 75–93 dB of instantaneous dynamic range, or 12–15 bits.

Figure 2:
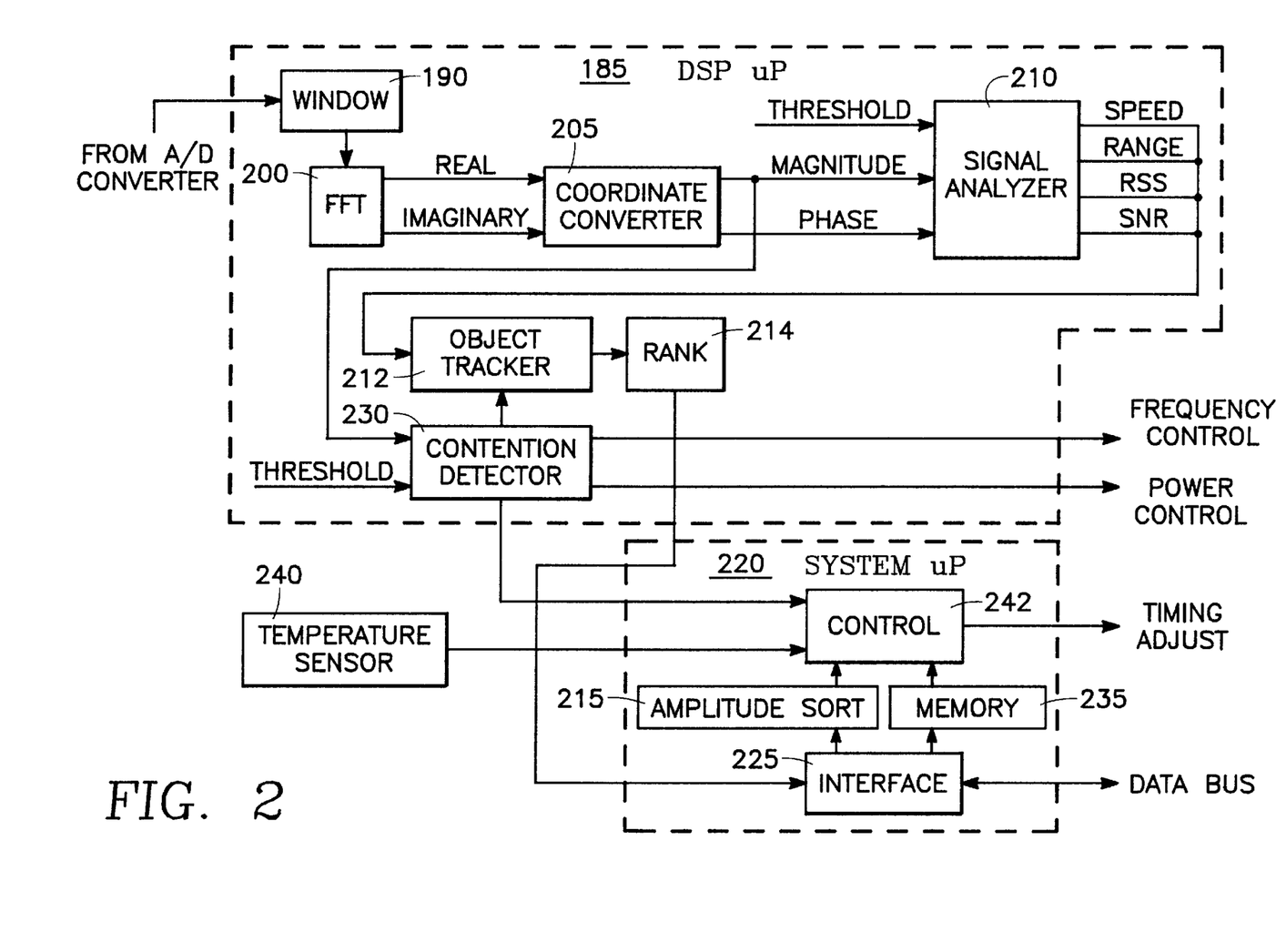
FIG. 2 is a block diagram of a digital signal processor and a system processor of a radar according to the invention.

The output of the A/D converter 180, a TTL digital signal with a plurality of samples, is multiplied by a window function 190, then processed by a fast Fourier transform ("FFT") algorithm 200 in a digital signal processor ("DSP") 185, shown in FIG. 2. The signals are converted from cartesian coordinates to polar coordinates by a coordinate converter 205. The signals are processed by a conventional signal analyzer 210, which sorts received signals by rejecting signals that do not meet a certain threshold values of amplitude (i.e. reject weak signals) and Doppler shift (i.e. reject velocities outside an anticipated velocity range of targets). The output of the analyzer 210 for each sorted received signal in the received channel is a speed and range of an object, received signal strength ("RSS"), and received signal to noise ratio ("SNR"), which information is sent to an object tracker 212.

The object tracker 212 calculates a smoothed range, smoothed velocity, and acceleration from the past and present data. The results are sent to a ranker 214, which calculates the time to impact for each signal and ranks the signals according to priority, from the most important signal to least important signal. The ranking is based on time to impact and how long the signal has been active. The ranker 214 reduces all of the received signals to a single warning value and sends the warning value to a system processor 220. The system processor 220 outputs the warning value onto the data bus.

The system processor 220 communicates with other radar system components, it communicates with external system components such as a user display, and it directs changes in the transmitted signal to avoid overlapping signals. An interface 225 permits users to input new threshold amplitude values, to adjust the operating frequency, to adjust the output power, and to monitor the status of various signals in the DSP including the values of detected range and velocity.

As described below in reference to the operation of the FFT 200, the signals are analyzed by a contention detector 230 to determine if there is contention between the sorted received signals. As is well known to those skilled in the art, "contention" or interference is declared if a channel being received, e.g., the transmit channel, becomes occupied by more than one user. If contention is detected, the contention detector 230 directs changes in the frequency and/or time slot of the transmitted signal to minimize or eliminate the contention. A control 242 receives signals from the contention detector 230 to control the frequency, timing, and power of the RF transmission.

Figure 5:
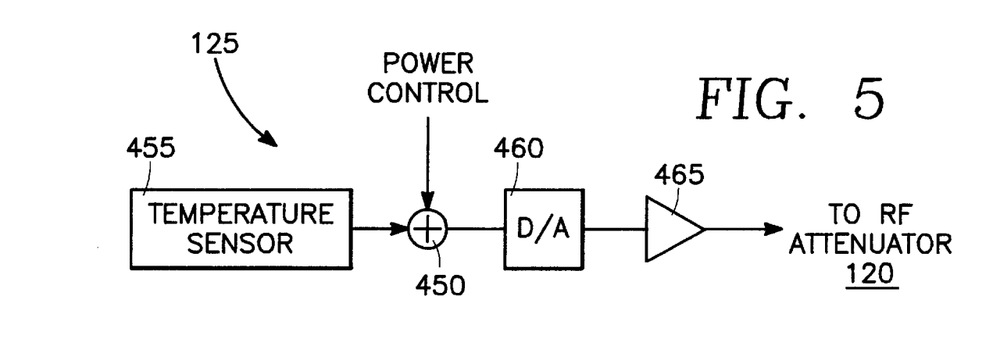
FIG. 5. is a block diagram of a power adjust circuit of a radar according to the invention.

A non-volatile memory 235 stores initial values of various system settings upon system turn on, such as the carrier frequency and signal power level. The memory 235 also allows the user to change these values through the interface 225 and the control 242. A conventional temperature sensor 240 is used to compensate for changes in temperature. An amplitude sort 245 provides a power control signal to the control 242 that is either based on an initial setting (from the memory 235), a temperature correction to that setting (as described below in reference to FIG. 5), or a new amplitude if signals are detected in the channel being observed (from the RSS signal from analyzer 210).

Figures 3A, 3B, 4:
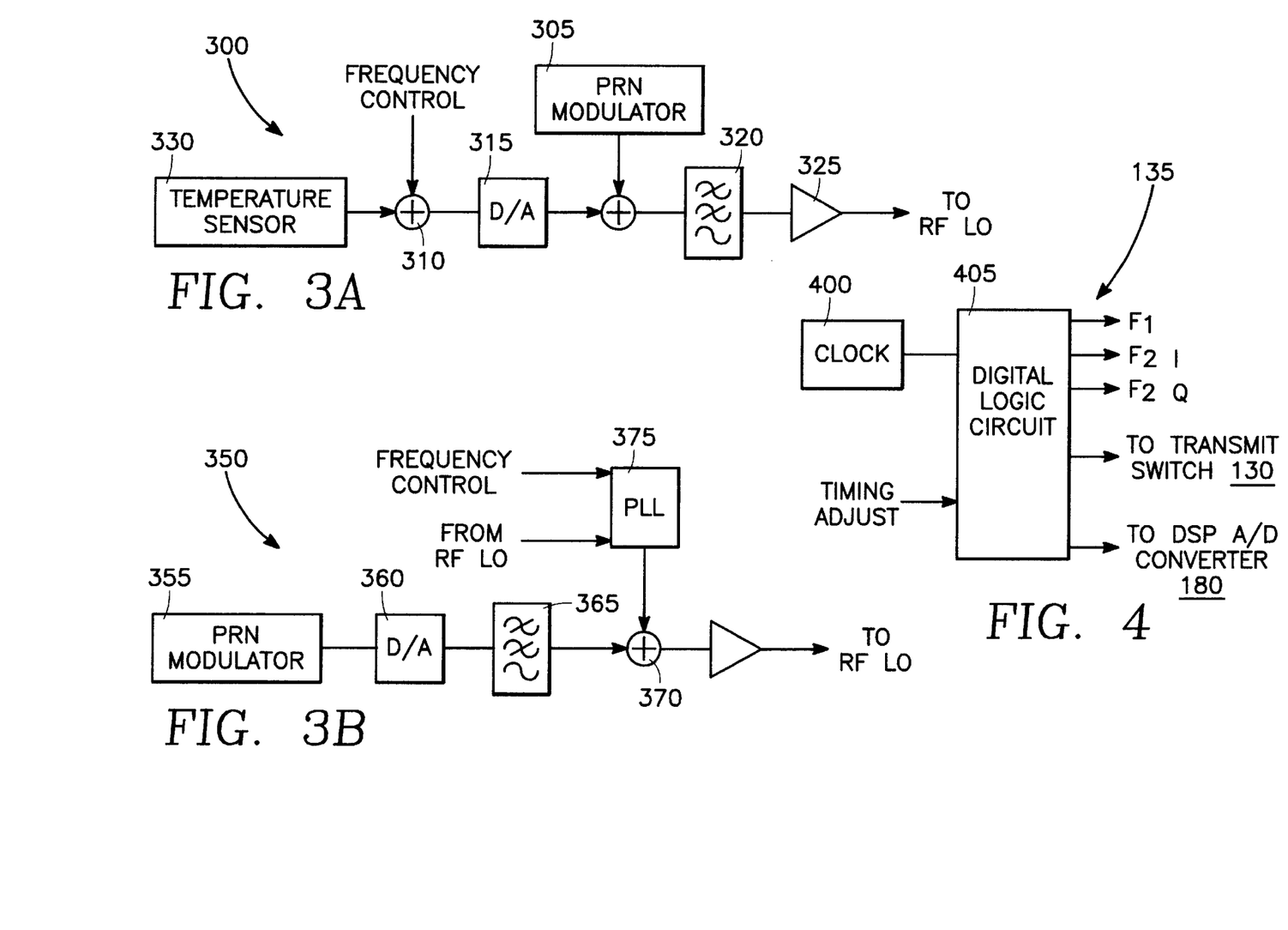
FIG. 3A. is a block diagram of a first embodiment of a frequency control circuit of a radar according to the invention.
FIG. 3B. is a block diagram of a second embodiment of a frequency control circuit of a radar according to the invention.
FIG. 4. is a block diagram of a timing control circuit of a radar according to the invention.

The frequency controller 110 (shown in FIG. 1) is used to maintain the transmit frequency LO in the operating band and to provide a range of transmission frequencies for a frequency division multiple access (FDMA) feature of the invention. Two embodiments of the controller 110 are shown in FIGS. 3A and 3B. In FIG. 3A, a conventional open loop control circuit 300 is illustrated. A frequency control signal, for example a TTL digital control signal, is provided by the system processor 220 (shown in FIG. 2) and sets a transmit frequency. This frequency is added to the output of a temperature sensor 330 in a first summer 310. The output of the first summer 310 is converted to an analog signal by D/A converter 315. The output from the D/A converter 315 is added to a pseudo-random noise ("PRN") modulator 305 in a second summer 332 to spread the frequency of the transmit signal. For example, the transmitted signal would be a flat frequency noise spectrum of approximately 1 MHz bandwidth. The output of the second summer 332 is filtered by filter 320 to remove sharp transitions in order to minimize unwanted high order frequency shifts. The output of filter 320 is buffered by buffer 325 and drives the oscillator 105 (shown in FIG. 1). Temperature compensation is provided by a temperature sensor 330.

A conventional closed loop control circuit 350 is shown in FIG. 3B. Again, a PRN modulator 355 is used to generate a spread spectrum signal that is converted to an analog signal by an A/D converter 360 and filtered by filter 365. The output is summed by summer 370 with the output of a conventional phase locked loop ("PLL") 375. A frequency control signal for the PLL 375 is provided by the system processor 220 (shown in FIG. 2) and a feedback signal for the PLL 375 is provided by a power tap from the oscillator 105 (dotted line shown in FIG. 1). The output of the summer 370 drives the oscillator 105 (shown in FIG. 1).

The timing circuit 135 (shown in FIG. 1) conventionally provides an accurate means to measure phase differences for a diplex ranging function, but in the invention it also provides time slots for a time division multiple access ("TDMA") feature. One implementation of the timing circuit 135 is shown in FIG. 4. A clock 400 provides a time reference, typically in the range of 10 to 40 MHz, to a digital logic circuit 405. A timing adjust signal from the system processor 220 (shown in FIG. 2) is also provided to the digital logic circuit 405. The digital logic circuit 405 generates RF signals F1, F2I and F2Q (shown in FIG. 1), as explained previously. The digital logic circuit 405 also generates a novel timing signal sent to the transmit switch 130 (shown in FIG. 1) that sets the time slot for the transmit signal in accordance with the TDMA feature of the invention. The digital logic circuit 405 also generates a clock signal sent to the A/D converter 180 (shown in FIG. 1) to adjust its sampling rate.

The power adjust circuit 125 (shown in FIG. 1) conventionally provides power control to satisfy legal maximum transmit power limits, but in the invention it also provides a power reduction function to reduce interference to other users. In the power adjust circuit 125 shown in FIG. 5, a power control signal is provided by the amplitude sort 245 (shown in FIG. 2) to a summer 450, which sums the power control signal and a temperature compensation signal from a temperature sensor 455. The resulting signal is converted to an analog voltage by D/A converter 460 and buffered by a buffer 465. The signal is then sent to the RF attenuator 120 (shown in FIG. 1).

The invention uses spread spectrum signals and random access protocols to eliminate or minimize interference from other CW diplex Doppler radars in a multi-user environment such as a vehicular collision avoidance system. In general, "multiple access" means a group of users sharing a common group of channels for transmitting information, such a radar signals. If several users transmit on the same radar channel, interference occurs and the invention implements a protocol to sort the users and channels into a non-overlapping pattern. Specifically, the invention uses techniques such as TDMA, FDMA and adjustment of transmit power levels to allocate users to non-interfering channels.

The initial carrier frequency LO and power levels are stored in the non-volatile memory 235, for example an EEPROM, of the system processor 220 (both shown in FIG. 2). For example, a typical carrier frequency is 24.125 GHz. The carrier frequency is spread by the frequency controller 110 (shown in FIG. 1) to reduce the interference from other radar signals in the operating environment. For example if the transmit signal bandwidth is approximately 1 MHz and the receive bandwidth is 72 Hz, the use of PRN spread spectrum modulation will suppress co-channel interference by 41 dB.

The invention also reduces interference by making more channels available in a given bandwidth by using TDMA. The frequency controller 110 sets a desired frequency in an available bandwidth. Using the open loop circuit 300 of FIG. 3A, however, operation close to the band edges must be avoided because of the limited accuracy of this type of frequency control. For example, if the available bandwidth is 100 MHz only approximately 80 MHz of the band is useable. Several frequency channels can be allocated in this useable band. If a transmission bandwidth is 1.3 MHz, comprised of a 1 MHz spread carrier bandwidth and diplex separation of 300 KHz, and a frequency step size is 10 MHz, which is typical for open loop accuracy, then the number of frequencies available is the usable band divided by the frequency step size, or 8 frequencies.

Because the closed loop circuit 350 shown in FIG. 3B provides more accurate frequency control than an open loop circuit 300 of FIG. 3A, more frequencies are available in a bandwidth of the same size. For example, using the same 100 MHz bandwidth, approximately 96 MHz of the band is useable and a step size of 2 MHz is possible. Assuming the same transmission bandwidth of 1.3 MHz, the number of frequencies available is 48, or 6 times as many as with the open loop circuit 300 of FIG. 3A. However, the open loop circuit 300 is more economical than the closed loop circuit 350 of FIG. 3B, and a choice between the two frequency control techniques must balance these factors.

Interference is also reduced in the invention by making additional channels available by using TDMA. The time slots in the transmit signal are generated through pulse modulation by the transmit switch 130 that is controlled by the timing circuit 135 (shown in FIG. 1). The switch on time, or pulse width, is W and the pulse repetition interval, or frame time, is I. The number of time slots is determined by the minimum value of W and the system update rate.

To compute the minimum value of W, the following basic Doppler equation is used to calculate the Doppler shift for a minimum velocity to be measured:

$$D = \frac{2v}{\lambda}$$

where D equals the Doppler frequency shift, v is the velocity and λ is the transmission wavelength. For example, if a design goal is to measure the speed of objects to within ±1 miles per hour, the Doppler frequency is 72 Hz. at the operating frequency of 24.125 GHz. This must be equal to a bandwidth of one element of the FFT 200 (shown in FIG. 2), or "FFT bin size". The minimum time domain value, i.e., W, that can be measured with this FFT bin size is 1/FFT bin size, or 14 milliseconds.

The system update rate is determined by the number of time slots desired and the rate at which it is desired to update the output, i.e., the screen refresh rate. A comfortable system update rate for human observation is 100 milliseconds, which divided by the minimum W provides 7 time slots. The system update rate is equal to the combined latency time for the DSP 185 and the system processor 220 (shown in FIG. 2), and it must be less than the frame time I or the radar system cannot process the received signals. Thus, the frame time I is this example is approximately 100 milliseconds.

The FFT bin size also determines a minimum sample frequency for the clock 400 (shown in FIG. 4). For example using the receive IF frequencies used previously of 100 and 200 KHz, a sampling rate of at least 400 KHz would be required using the Nyquist criterion. This frequency is divided by the FFT bin size, e.g., 72 Hz, to compute the number of elements in the FFT 200 (shown in FIG. 2), which would be at least 5,555 elements. However, since it is well known that FFT algorithms are more efficient if the number of elements is equal to a power of 2, the element size that exceeds 5,555 and is a power of 2 would be 8,192 elements. The minimum clock speed is equal to the number of elements times the FFT bin size, for example 8,192 elements times 72 Hz, or 589 KHz. This relation may be expressed by the following formula:

$$FS = n\Delta f$$

where FS is the clock frequency, n is the number of bins and Δf is the bin size.

Since a channel is a specific time slot and frequency, the number of channels provided by a radar of the invention is the number of time slots times the number of frequencies available. In the examples provided above, the number of channels provided by the open loop circuit 300 of FIG. 3A is 7 times 8, or 56, and by the closed loop circuit 350 of FIG. 3B is 7 times 56 or 392.

As described previously, the signal analyzer 210 (shown in FIG. 2) sorts received signals by a rejection of signals having amplitudes and phase differences different than predetermined threshold values related to estimated values for the ranges and speeds of interest, for example those anticipated for surface vehicles. When a received channel is occupied by more than one user and the received signals contend or interfere with one another, this condition is detected by the contention detector 230.

The contention detector 230 performs this function by sampling RSSs in the received channel from a group of FFT bins that represent signals outside the anticipated velocities of possible targets, such as surface vehicles. This approach is used because if only bins in the range of possible velocity values were examined, it would be difficult to sort return signals from interfering or contending signals. For example in the FFT example provided previously of 8,192 bins in which each bin represents a velocity range of ±1 miles per hour, most of bins represent Doppler signals for objects traveling at "impossible" speeds, i.e., of several thousand miles per hour.

The contention detector 230 selects a group of bins for these impossible speeds, for example 200 bins, and computes an average RSS for these bins. The average RSS is then compared to a threshold value based on a measurement of a noise floor of the system, i.e., when no interference is present in the received channel. When the average RSS exceeds the noise floor by a fixed value, for example by 20 dB, this condition indicates interference in the receive channel. When interference is present from another spread spectrum signal, the interference will be spread across all FFT bins equally. In the process of down converting the signals at the antenna (which contains the radar return and the interference), the interference is spread across several MHz. However, the radar return is less than 72 Hertz wide after down conversion due to coherent correlation. Therefor only a small part of the interference signal is co-channel with the radar return signal at the A/D. For example if one bin level rised one dB due to interference, all the bins levels will rise by one dB. Thus, if interference is detected in bins of impossible velocity ranges, it is bins of possible velocity ranges, and a change in the transmitted channel is necessary to avoid the contention.

The contention detector 230 selects another channel by using a contention protocol, such as ALOHA or a modified reservation ALOHA explained below. For example, a random number is chosen which represents a next time slot and a next frequency channel, which number is used in a channel selecting algorithm to select a non-interfering channel for the transmit signal. Typically the channel selecting algorithm will select a time slot within one time frame I from the contention. The random number can be calculated in software or read from a hardware look-up table. The contention detector 230 then sends a frequency control to the frequency controller 110 or a timing adjust signal to the timing circuit 135 (both shown in FIG. 1) to modify the channel of transmitted signal to avoid the contention. The protocol used by the contention detector 230 begins at system turn on with standard ALOHA, and later after the received signals are sorted, it changes to a modified reservation ALOHA as the probability of contention increases.

The modified reservation ALOHA used by the contention detector 230 is described here. In reservation ALOHA the available frequency bandwidth is organized into frequency slots, and each frequency slot is organized into succeding time frames and each time frame is subdivided into time slots. A 'slot' is therefor a combination of frequency and time. Ready stations transmit randomly into a slot. If the feedback from the slot indicates the transmission was successful then that station "owns" that slot for as long as it has something to transmit. If the feedback indicates a collision or contention then the station randomly selects another slot. In conventional reservation ALOHA the station listens in the slot for other transmissions and waits until the slot is clear before transmitting. For this invention we transmit without listening to the slot to achieve faster performance, and have labeled this method modified reservation ALOHA. Note the invention can use conventional reservation ALOHA, albeit with a slower throughput than the modified approach.

The amplitude sort 245 (shown in FIG. 2) may also send a power control signal to the power adjust circuit 125 (shown in FIG. 5) to reduce the amplitude of the transmitted signal during periods of strong signal reception. The purpose of this power reduction is to minimize the interference to other user radars caused by the transmit signal, and is referred to as adaptive gain or adaptive power control. The adaptive power level is calculated in software and is based on received signal strength, maximum permitted power level and target range.

Figure 6:
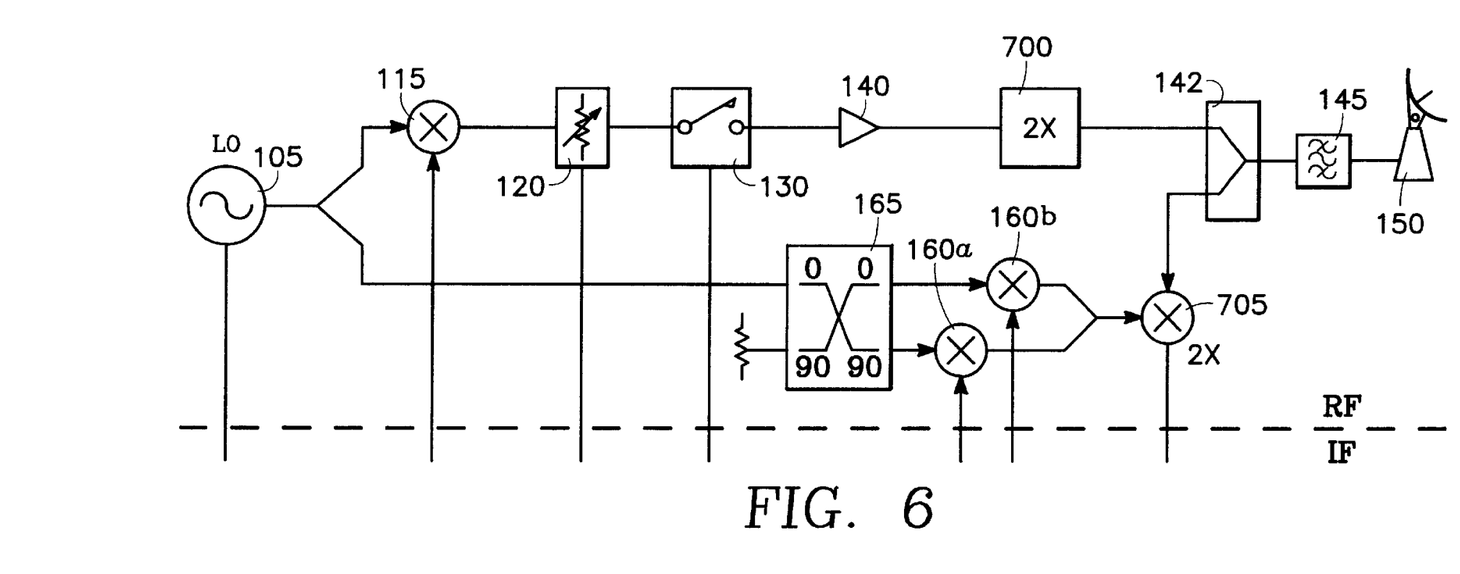
FIG. 6. is a flow diagram illustrating a method used by the invention for generating a transmit adjust signal.

An alternate embodiment of the transmitter portion of the invention is shown in FIG. 6, which has as its object to use lower frequency, active RF components. Many of the components are similar to those shown in FIG. 1 and are denoted by the same numbers. The carrier frequency at the antenna in FIG. 6 is 76 to 77 GHz. However, a frequency doubler 700 doubles $\triangle f$, the diplex separation. To achieve the same $\triangle f$, F1 is now typically 75 KHz and LO may is reduced to a range of from 38 to 38.5 GHz. A sub-harmonic mixer 705 is now used in place of the downconverter mixer 155 (shown in FIG. 1).

Thus, a CW diplex Doppler radar according to the invention reduces interference from other radars in a collision avoidance environment by an interaction between several novel radar features, including spread spectrum modulation, frequency hopping, time hopping, adaptive power control and protocol management.

Although the present invention has been described with reference to preferred embodiments, workers skilled in the art will recognize that changes may be made in form and detail without departing from the spirit and scope of the invention.

What is claimed:

1. A continuous wave diplex Doppler radar, comprising:
    an oscillator generating a carrier frequency modulated by an offset frequency to produce at least a diplex transmit signal, said oscillator having a frequency control input;
    a spread spectrum modulator coupled to said frequency control input for spreading the spectrum of said transmit signal, said spectrum modulater further comprising:
        a carrier frequency selector;
        a summer having plural input nodes, one of said input nodes connected to said frequency selector;
        a pseudo-random noise modulator connected to another of said input nodes of said summer;
        a temperature sensor connected to a further input node of said summer for compensation of frequency changes caused by temperature; and
        a digital to analog converter connected to an output of said summer and to said frequency control input.

2. A continuous wave diplex Doppler radar, comprising:
    an oscillator generating a carrier frequency modulated by an offset frequency to produce at least a diplex transmit signal, said oscillator having a frequency control input, and wherein said oscillator has a frequency measurement output;
    a spread spectrum modulator coupled to said frequency control input for spreading the spectrum of said transmit signal, said spread spectrum modulator further comprising:
        a carrier frequency selector;
        a phase lock loop connected to said carrier frequency selector and said frequency measurement output;
        a summer having plural input nodes, one of said nodes connected to said phase lock loop;
        a digital to analog converter connected to another of said input nodes; and
        a pseudo-random noise modulator connected to said digital to analog converter.

3. A continuous wave diplex Doppler radar, comprising:
    an oscillator generating a carrier frequency modulated by an offset frequency to produce at least a diplex transmit signal, said oscillator having a frequency control input, and wherein said oscillator generates said transmit signal during a time slot;
    a spread spectrum modulator coupled to said frequency control input for spreading the spectrum of said transmit signal;

a contention detector for sensing interference between a return signal and one of a plurality of received signals and generating a transmit adjust signal adjusting one of: (a) said carrier frequency and (b) said time slot; and an interference controller for adjusting a respective one of: (a) said carrier frequency and (b) said time slot in response to said transmit adjust signal.

4. The radar of claim 3 wherein said contention detector further comprises one of Aloha and a modified reservation Aloha.

5. The radar of claim 4 wherein said modified reservation Aloha comprises:

means for sensing frequency frames and time slots in one of said frequency frames;

means for selecting an unoccupied time slot in said frequency frame; and means for transmitting in said unoccupied time slot.

6. The radar of claim 3 wherein said contention detector comprises:

means for sensing a received signal strength of a signal having a Doppler frequency shift beyond a range of interest;

means for comparing said signal strength to a sum of a noise signal for said channel and a present threshold value; and means for declaring a contention exists whenever said signal strength exceeds said sum.

7. The radar of claim 6 wherein said contention detector comprises:

means for sensing a plurality of received signal strengths of signals having Doppler frequency shifts beyond a range of interest;

means for computing an average of said received signal strengths;

means for comparing said average to a sum of a noise signal for said channel and a present threshold value; and means for declaring a contention exists whenever said signal strength exceeds said sum.

8. The radar of claim 3 wherein said interference controller comprises:

a frequency controller for changing said carrier frequency in predetermined steps to provide frequency division multiple access to a predetermined bandwidth.

9. The radar of claim 8 wherein said frequency controller comprises a computer processor.

10. The radar of claim 3 where said interference controller comprises:

a pulse modulator for changing said time slot of the transmit signal to provide time division multiple access in a predetermined time interval.

11. The radar of claim 10 wherein said pulse modulator comprises:

a clock;

a digital logic circuit connected to said clock for generating time slots; and a transmit switch for turning on said transmit signal during a selected one of said time slots.

12. A continuous wave diplex Doppler radar, comprising:

an oscillator generating a carrier frequency modulated by an offset frequency to produce at least a diplex transmit signal, said oscillator having a frequency control input;

a spread spectrum modulator coupled to said frequency control input for spreading the spectrum of said transmit signal;

an amplitude sort for generating a power control signal based on received signal strengths; and, an RF attenuator for changing a transmit power in response to said power control signal whereby to provide adaptive gain in a predetermined range of transmit powers.

13. A continuous wave diplex Doppler radar, comprising:

an oscillator for generating a carrier frequency modulated by an offset frequency to produce at least a diplex transmit signal during a time slot;

a contention detector for sensing interference between a return signal and one of a plurality of received signals and generating a transmit adjust signal adjusting one of: (a) said carrier frequency and (b) said time slot; and an interference controller for adjusting a respective one of: (a) said carrier frequency and (b) said time slot in response to said transmit adjust signal.

14. The radar of claim 13 wherein said interference controller comprises:

a frequency controller for changing the carrier frequency in predetermined steps to provide frequency division multiple access to a predetermined bandwidth.

15. The radar of claim 14 wherein said frequency controller comprises a computer processor.

16. The radar of claim 13 wherein said interference controller comprises:

a pulse modulator for changing the time slot of the transmit signal to provide time division multiple access to a predetermined time interval.

17. The radar of claim 16 wherein said pulse modulator comprises:

a clock;

a digital logic circuit connected to said clock for generating time slots; and a transmit switch for turning on said transmit signal during a selected one of said time slots.

18. The radar of claim 13 further comprising:

an amplitude sort for generating a power control signal based on received signal strengths; and an RF attenuator for changing a transmit power in response to said power control signal whereby to provide adaptive gain in a predetermined range of transmit powers.

19. A continuous wave diplex Doppler radar, comprising:

means for generating a continuous diplex waveform having a spectrum at a carrier frequency during a time slot;

means for detecting contention between a return of said continuous diplex waveform and a plurality of received signals and generating a transmit adjust signal adjusting one of: (a) said carrier frequency and (b) said time slot; and means for adjusting a respective one of: (a) said carrier frequency and (b) said time slot in response to said transmit adjust signal.

20. The radar of claim 19 wherein said contention detecting means comprises:

a contention detector for sensing interference between a return signal and one of a plurality of received signals in a selected channel; and a contention protocol for generating a waveform adjust signal in response to a sensed interference.

21. The radar of claim 19 wherein said means for adjusting comprises:

a pulse modulator for changing the time slot of the continuous wave diplex waveform in response to a detected contention whereby to provide time division multiple access in a predetermined time interval.

22. The radar of claim 19 wherein said means for adjusting comprises:

a frequency controller for changing the frequency of the continuous wave diplex waveform in response to a detected contention whereby to provide frequency division multiple access to a predetermined bandwidth.

23. The radar of claim 19 wherein said means for adjusting comprises:

an RF attenuator for changing the transmit power of the continuous wave diplex waveform in response to a detected contention whereby to provide adaptive gain in a predetermined range of transmit powers.

24. The radar of claim 19 wherein said generating means having a frequency control input, further comprising:

a spread spectrum modulation means coupled to said frequency control input for spreading the spectrum of said continuous wave diplex waveform.

* * * * *